United States Patent

[11] 3,584,540

[72] Inventors Alex Petersen
Sonderborg;
Helge Kajholm Christensen, Svenstrup,
both of, Denmark
[21] Appl. No. 800,436
[22] Filed Feb. 19, 1969
[45] Patented June 15, 1971
[73] Assignee Danfoss A/S
Nordborg, Denmark

[54] HYDRAULIC SYSTEM HAVING BYPASS VALVE EFFECTIVE TO KEEP MOTOR SPEED OR PUMP OUTPUT CONSTANT
1 Claim, 10 Drawing Figs.
[52] U.S. Cl. .................................................. 91/468,
137/503, 417/299
[51] Int. Cl. ........................................................F15b 11/08,
F15b 13/042
[50] Field of Search .......................................... 417/299;
137/503; 91/468

[56] References Cited
UNITED STATES PATENTS

| | | | |
|---|---|---|---|
| 3,131,716 | 5/1964 | Griswold et al. | 137/503 |
| 3,148,623 | 9/1964 | Sayers | 417/299 |
| 3,450,057 | 6/1969 | Baines et al. | 91/121X |

*Primary Examiner* — Martin P. Schwadron
*Assistant Examiner* — Irwin C. Cohen
*Attorney* — Wayne B. Easton

ABSTRACT: A bypass valve for use in a hydraulic system having a hydraulic motor or pump. The bypass valve shunts the motor or pump and connects the supply and discharge lines thereto and in response to pressure drops across the motor or pump bypasses fluid to keep the motor speed or pump output constant. The bypass valve compensates for motor or pump fluid leakage and keeps the sum of the quantity of fluid flow through the bypass valve and the leakage fluid constant. The bypass valve has a nonlinear characteristic curve determined by bypass orifices of varying dimensions controlled by a pressure-responsive axially movable slide.

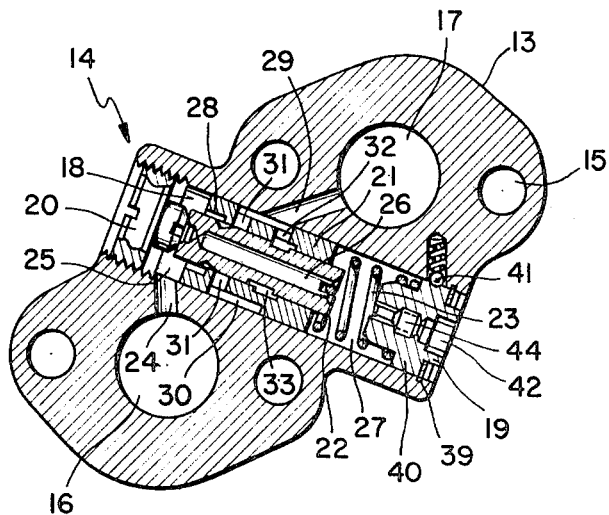
FIG 5
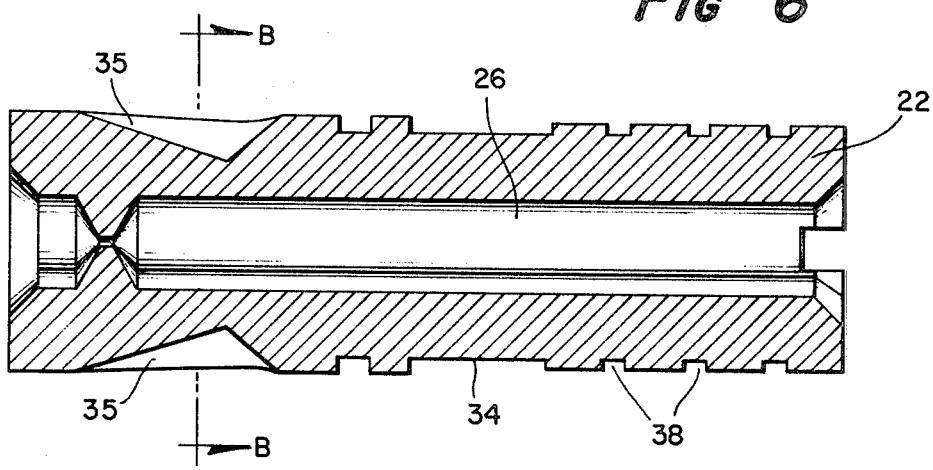
FIG 6
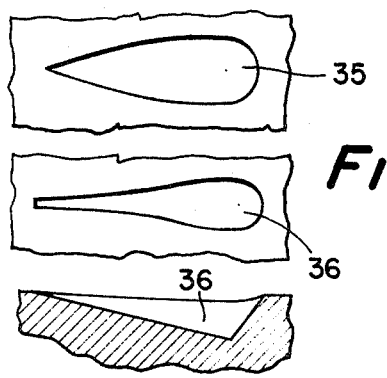
FIG 7
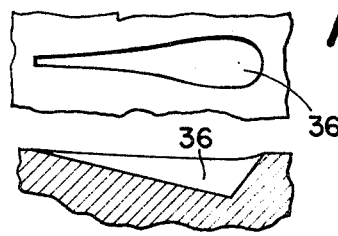
FIG 8
FIG 9
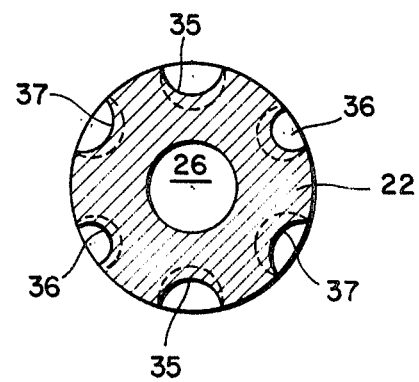
FIG 10

HYDRAULIC SYSTEM HAVING BYPASS VALVE EFFECTIVE TO KEEP MOTOR SPEED OR PUMP OUTPUT CONSTANT

This invention relates generally to hydraulic systems and more particularly to a control device, for use with hydraulic motors or pumps, comprising a bypass valve, which is controlled in dependence upon a pressure drop at a pump or motor which it shunts.

Theoretically, a hydraulic motor, that is supplied with a constant quantity of fluid under pressure per unit time, should rotate at a constant speed. In practice, however, the speed decreases as the load on the motor increases. The lower the speed of the motor, the greater is the percentage decrease in speed. The same applies in the case of a pump that is driven at constant speed. Theoretically the pump should deliver a constant output quantity of fluid. In practice, however, the quantity delivered as an output diminishes with increasing load.

A hydraulic system is known wherein a variable hydraulic resistor or variable restriction is connected on the discharge side of a hydraulic motor for adjusting motor speed. The motor and the variable flow resistor are bridged by a bypass valve. The bypass valve is controlled in dependence upon the pressure drop across the resistor or restriction in such a manner that as the drop in pressure increases, the bypass valve opens wider. This arrangement is used to try to keep the speed of the motor approximately constant even when the load fluctuates. This intended object is not completely achieved however, since the quantity of fluid flowing through the hydraulic motor is not a measure of the speed of the motor (the speed is made up of or determined by both the operating fluid and fluid lost by leakage) and because it does not enable the regulating circuit to keep the quantity of fluid flowing through the resistor constant. Moreover, the provision of an additional hydraulic resistor or variable restriction in the hydraulic circuit has a considerable interference effect.

A principal object of the present invention is to provide a device for use with hydraulic motors or pumps which enables the speed of a motor or the quantity of fluid delivered by a pump to be kept constant over a wide range of load variations, using simple means, and to do this even a low speeds or when small quantities of fluid are delivered. In another form of the invention, it is intended that the same device shall be used on hydraulic machines of widely varying kinds and sizes, or on the same machine the characteristics of which have changed as a result of wear.

According to the invention, this object is achieved by a bypass valve being controlled by the pressure drop at the machine, by its increasingly throttling a parallel flow as the pressure drop increases and, for a predetermined small drop in pressure, by it letting through at least a quantity of fluid roughly equal to the amount of oil leaked by the machine at the maximum operational pressure drop.

With this arrangement, a parallel stream is passed constantly through the bypass valve substantially over the entire load range. The greater the leakage at the machine, the more is the parallel stream throttled. Use is made of the realization that the leakage at the machine is largely dependent only upon the pressure drop at the machine and the magnitude of this pressure drop can therefore be used for compensating the leakage oil or fluid. Of the quantity of fluid under pressure supplied by the pump, which quantity is normally constant for a given motor speed, a proportion is, therefore, branched off through the bypass, this proportion is dependent upon the conditions of load and therefore upon the pressure drop at the motor. Thus, a predetermined proportion of the entire quantity supplied, i.e. the sum of the amount of oil leaked and the amount that goes through the bypass, does no work. If this sum is approximately constant at all conditions of load, the quantity flowing through the motor at working capacity remains approximately constant and, therefore, so does the motor speed, independent of the load.

It is particularly advantageous if the pressure-flow characteristics of the bypass valve are adapted to the pressure-leakage quantity characteristics of the hydraulic machine in such a way that the sum of the quantity that flows through the valve and the quantity leaked is roughly constant. In this way, the changes in speed can be limited to a few percent even for low speeds.

If the bypass valve has several selectively openable flow passages having different pressure-flow characteristics, then one and the same bypass valve to different kinds of hydraulic motors or pumps by a simple change over operation, or an adjustment can be made in the same machine as a result, for example, of a change in characteristics due to wear.

The pressure-leakage amount characteristic curve of a hydraulic machine is normally not linear. It is therefore expedient for the bypass valve also to have a correspondingly non linear characteristic curve. This can be achieved, for instance, by using a valve-loading spring that has a rounded characteristic curve. A particularly simple form of construction is obtained if the bypass valve is a slide valve having control orifices on the periphery of the fixed and moving parts, one at least of the orifices is preferably of variable width in the axial direction and/or is formed by a groove having a depth varying in the axial direction. In particular, one part of the valve may have, in the axial direction, a succession of spaced orifices which communicate with the supply and discharge line respectively and are bridged by a longitudinal groove of variable width and/or depth in the other part. With such an arrangement, axial displacement of the slide does not lead to a proportional change in the quantity of fluid that passes through.

In order to provide the bypass valve with several selectable flow passages, it is advantageous to arrange at least one of the spaced orifices in one part of the valve only along a portion of the periphery, and to distribute longitudinal grooves of different shape over the periphery of the other part of the valve and to arrange for the two valve parts to be relatively rotatable to each other and lockable in prescribed positions. In the locked positions another longitudinal groove cooperates, in each case, with the spaced orifices. It is of particular advantage if the different longitudinal grooves and the associated orifices are arranged diametrically in pairs around the periphery. Pressure equalization is thereby achieved in a simple manner.

A contribution to the simplification of the construction is made if the moving slide has, on its periphery, the different longitudinal grooves, is loaded by a spring supported on a seat plug, and is coupled to the seat plug by the spring to receive a rotary drive. The seat plug can be held in a number of angular positions by a latch device. If the plug is turned, then the slide is moved from one of its effective positions to the other. None of this interferes with the axial displacement of the slide. Rather, the other side of the slide is still available for an additional function. For example, a stop plug can be provided at the end of the slide opposite the spring so that the plug can be moved axially by screwing so as to adjust the initial position of the slide and thus the maximum opening of the valve.

Furthermore, a set screw is fitted in the seat plug and on which the spring is supported and with the help of which the spring tension can be adjusted. In the simplest case, the two ends of the bypass valve can be connected directly to the lines for hooking up the hydraulic machine.

An arrangement that is particularly space saving and simple is one wherein the bypass valve is accommodated between the two motor-connection lines and in a straight-through bore which is closed at one end by the seat plug and at the other by the stop plug. If the housing is sufficiently thick, the bypass valve can be fitted between the two fluid connections in the housing of the motor.

If the hydraulic motor is reversible and can be driven in both directions the bypass valve is preferably arranged in series with a check valve. This ensures that the bypass valve is not acted upon in the wrong position. In such an arrangement the oil leakage is compensated only for one direction of rotation of the motor.

Another possibility consists in fitting the bypass valve in the branch of a bridge constituted by four check valves. The fluid passes through the bypass valve in the same direction for both directions of rotation of the motor, and an automatic changeover of the branches is achieved.

Still another embodiment of the system consists in accommodating the bypass valve in an intermediate flange attached to the motor. The flange has straight-through bores which, on the one hand act as connections and, on the other, communicate with the connecting pipes of the motor. An intermediate flange of this kind can also be turned through 180° and thus suited to the direction of rotation of the motor.

Other features and advantages of the hydraulic system and control unit in accordance with the present invention will be better understood as described in the following specification and appended claims in conjunction with the following drawings in which:

FIG. 5, is a section view through a bypass valve taken on section line A–A of FIG. 4;

FIG. 6, is a section view of the slide of the bypass valve of FIG. 5 on a larger scale;

FIG. 7, is a plan view of a longitudinal groove in the slide of FIG. 6;

FIG. 8, is a plan view of another longitudinal groove in the slide of FIG. 6;

FIG. 9, is a longitudinal section through the longitudinal groove of FIG. 8, and FIG. 10, is a cross section view taken on a section line B–B of FIG. 6.

Figure 1:
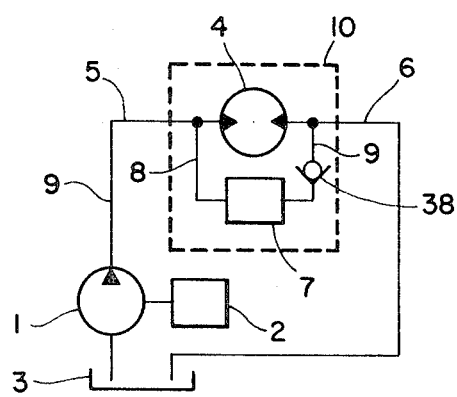
FIG. 1, is a diagram of a hydraulic system having a device according to the invention connected therein.

FIG. 1 illustrates a hydraulic system in which an oil pump 1, the speed of which is regulatable by means of a control device 2, takes an oil suction from a tank 3 and supplies it to a hydraulic motor 4 through a supply line 5. A discharge line 6 from the motor leads back to the tank 3. The hydraulic motor 4 is bridged by a bypass valve 7, which is connnected to the supply and discharge lines respectively through line 8 and 9. The bypass valve 7 can be combined with the motor 4 to form one unit 10 as indicated in broken lines.

In the embodiment illustrated in FIG. 1 the motor 4 rotates in one direction only. A check valve 38 prevents the bypass valve 7 from functioning incorrectly in the event that the motor is to be driven in the opposite direction.

Figure 2:
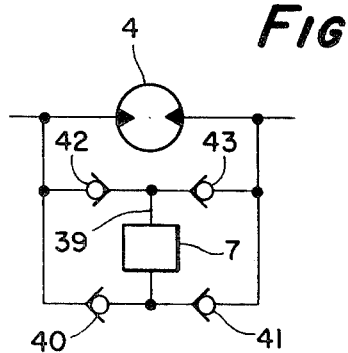
FIG. 2, is a modified arrangement or diagram of a hydraulic system according to the invention.

In a second arrangement shown in FIG. 2, wherein parts similar to FIG. 1 are similarly designated, the bypass valve 7 is connected in a branch 39 of a bridge comprising four check valves 40, 41, 42 and 43. These check valves automatically provide for fluid to flow through the bypass valve always in the same direction irrespective of the direction of rotation of the motor 4.

Figure 3:
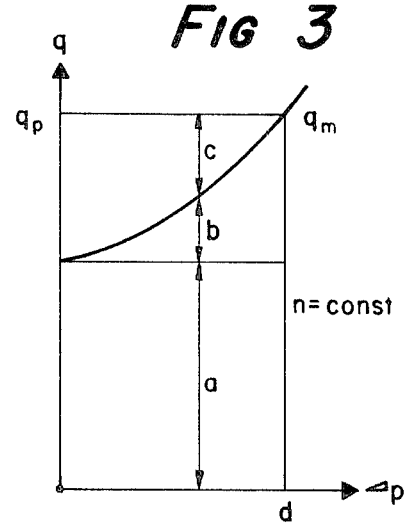
FIG. 3, is a diagram of a curve illustrating the pressure drop/amount of fluid characteristic curve of a hydraulic motor.

In FIG. 3, the pressure drop $\Delta p$ at the motor 4 is plotted against the quantity $q_m$ of fluid flowing through the motor when the latter is operating at a constant speed $n$. To maintain this speed, the quantity $a$ must flow through the motor at working capacity. It can be seen that with increasing load, that is with increasing pressure drop, the amount $b$ of oil leaked by the motor increases. A quantity $c$ flows through the bypass valve and is regulated in dependence upon the pressure drop $\Delta p$, such that the sum $a+b+c$ is approximately constant over a substantial part of the operating range, i.e., gives just the constant quantity $q_p$ delivered by the fluid pump 1. The quantity $a$ changes if the motor is to assume another speed. The amount $b$ of oil leakage and the amount $c$ carried through the bypass are, however, independent of the speed and are largely only dependent upon the pressure drop $\Delta p$. Optimum operation is achieved if the quantity $c$ blowing through the bypass valve becomes zero at maximum loading, i.e. at the point $d$. There is, however, no departure from the principle of the invention if a certain quantity of fluid still passes through the bypass valve in this condition of operation.

Figure 4:
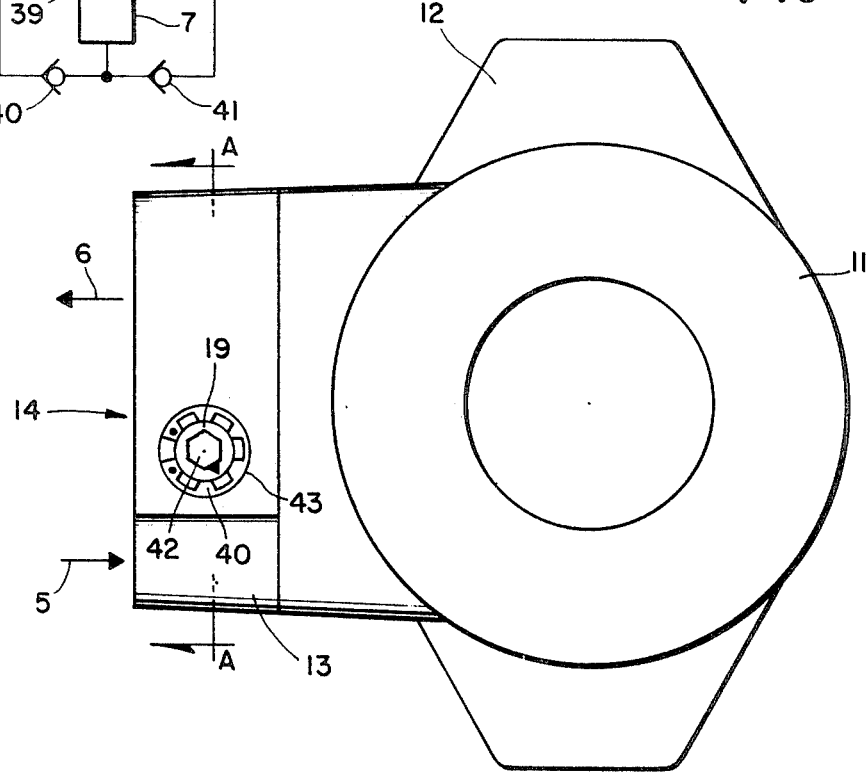
FIG. 4, is an end view of a hydraulic motor.

FIG. 4 is a schematic illustration of a hydraulic motor 11 having a mounting flange 12. On the connection side of the motor is disposed an intermediate flange 13, which carries a bypass valve 14. The supply line 5 and the discharge line 6 are indicated by arrows. It can be seen from the cross section shown in FIG. 5, that the intermediate flange has holes 15 for mounting bolts. A straight-through supply bore 16 provides a connection for the supply line 5 and communicates with the supply line in the motor housing. Another straight-through discharge bore 17 provides a connection for the discharge line 6 and communicates with the discharge line in the motor housing. In between is disposed a transverse straight-through bore 18, which is closed at one end by a seat plug 19 and at its other end by a stop plug 20.

Within the transverse bore 18 is fixed a sleeve 21, in which a slide 22 can move in an axial direction. The slide is pressed against the threaded stop plug 20, which is displaceable by screwing it, by means of a spring 23 which bears against a radial shoulder on the seat plug 19 and against a second radial shoulder on the slide 22. The maximum opening of the valve can be adjusted with the plug 20.

The supply bore 16 communicates through a connecting passageway 24, with a chamber 25 between the sleeve 21 and the stop plug 20. This chamber in turn communicates, through an axial bore 26 in the slide 22, with a chamber 27 housing the spring, so that both end faces of the slide are under pressure from the fluid supplied. The pressure of the fluid supplied also obtains in an annular groove 28 in the sleeve 21.

The discharge bore 17 communicates, through a connecting bore or passageway 29, with an outer annular chamber 30 in the sleeve, from diametrically opposite points of which two bores or passageways 31 extend to the periphery of the slide. Another set of passageways 32 leads to an annular groove 33 in the sleeve, which cooperates with an annular groove 34 in the slide. The discharge pressure thus obtains in the last-mentioned grooves or cavities.

As can be seen in greater detail in FIG. 6, the slide 22 is of somewhat greater diameter to the left of the annular groove 34 than to the right thereof. The face resulting from this difference in diameter is under influence of the discharge pressure, while an equally large part of the end face in the chamber 25, which is not relieved by the pressure in the chamber 27, is acted upon by the supply pressure. Consequently, the slide is acted upon by the pressure drop at the motor and moves to the right against the force of the spring 23, until a condition of equilibrium is reached.

The slide also has pairs of diametrically opposite longitudinal grooves 35, 36 and 37, which have a width and depth that vary over their lengths, (compare the longitudinal grooves in FIGS. 6 and 7 with the longitudinal grooves 36 in FIGS. 8 and 9). These longitudinal grooves connect the annular groove 28 and the pair of bores 31 in the sleeve 21, which are a small distance away from each other. That part of the longitudinal grooves located between the annular groove 28 and the bores 31 is responsible for the quantity of oil flowing from the pressure side to the discharge side. The forms of the longitudinal grooves are so selected that they correspond to the leakage oil characteristics of the associated hydraulic motor as in FIG. 3. Circumferential grooves 38 in the slide provide for the supply and discharge pressures being well sealed against each other.

The seat plug 19 is held in position by a circlip 39. In its periphery it has three recesses 40, in which can engage a spring-loaded locking sphere 31, when the plug is rotated by engaging a spanner in a hexagonal hole 42. During this rotation, the plug turns the slide 22 through the spring 23, so that in each locking position, another pair of the longitudinal grooves 35, 36 or 37 establishes connection between the annular groove 28 and the pair of bores 31. The particular rotary position that has been set can be read off by means of an arrow as index mark 43. Inside the plug 19 is a pressure-release screw 44 for setting the spring 23.

When a loaded motor is started up, a greater starting torque has to be overcome. By increasing the pressure appropriately upstream of the motor, the bypass valve can be fully closed, so that a sufficiently great pressure can be built up at the motor for setting it in motion. The bypass valve does not therefore interfere with the starting up operation.

While preferred embodiments of the invention have been shown and described, it will be understood that many modifications and changes can be made within the true spirit and scope of the invention.

What I claim and desire to be secured by letters patent is:

1. A bypass valve for use in a hydraulic system having a hydraulic machine comprising a hydraulic motor or a pump connected to hydraulic supply and discharge lines, said bypass valve comprising means defining connections for connecting it shunting said machine and to said supply and discharge lines for controlling fluid therethrough in response to pressure drops across said machine, means comprising pressure-responsive means in said bypass valve responsive to pressure drops across said machine variably controlling flow through said valve and throttling fluid flow through said valve as the pressure drop across said machine increases and responsive to a predetermined small drop in pressure across said machine for allowing fluid flow through said valve approximately equal to fluid leakage in said machine, said means comprising said pressure-responsive means comprises means bypassing hydraulic fluid through said bypass valve such that the sum of the amount of fluid through said valve and the leakage fluid of said machine is substantially constant, said valve comprises means including said pressure-responsive means defining flow passages through said valve having different pressure-flow characteristics, said means including said pressure-responsive means constitute relatively movable means defining grooves of varying cross section constituting said flow passages, said relatively movable means comprise relatively rotatable means defining said grooves angularly disposed relative to each other, said grooves having different cross sections from each other, said relatively rotatable means are rotatable to positions for selecting which of said grooves will function as flow passages for a given relative position of said rotatable means.